United States Patent [19]

Fabricius et al.

[11] Patent Number: 5,519,145
[45] Date of Patent: May 21, 1996

[54] PHOTOGRAPHIC ELEMENT WITH ETHER DYES FOR NEAR-INFRARED ANTIHALATION

[75] Inventors: Dietrich M. Fabricius, Hendersonville, N.C.; Thomas Schelhorn, Neu-Isenburg, Germany

[73] Assignee: E. I. Du Pont de Nemours and Company, Wilmington, Del.

[21] Appl. No.: 225,388

[22] Filed: Apr. 8, 1994

Related U.S. Application Data

[63] Continuation-in-part of Ser. No. 195,068, Feb. 14, 1994, abandoned.

[51] Int. Cl.$^6$ .................................................. G03C 1/83
[52] U.S. Cl. ................................. 548/450; 430/522
[58] Field of Search ............................. 548/450; 430/522

[56] References Cited

U.S. PATENT DOCUMENTS

| | | | |
|---|---|---|---|
| 5,164,291 | 11/1992 | West et al. ........................ | 430/522 |
| 5,190,854 | 3/1993 | Goedeweeck ..................... | 430/522 |
| 5,330,884 | 7/1994 | Fabicius et al. .................. | 430/522 |

FOREIGN PATENT DOCUMENTS

| | | |
|---|---|---|
| 1318808 | 3/1988 | Canada . |
| 0251282 | 1/1988 | European Pat. Off. . |
| 0292322A2 | 11/1988 | European Pat. Off. . |
| 0350026A2 | 1/1990 | European Pat. Off. . |
| 0580145 | 1/1994 | European Pat. Off. ........ 430/522 |

OTHER PUBLICATIONS

L. Strekowski et al., Substitution Reactions of a Nucleofugal Group in Heptamethine Cyanine Dyes. Synthesis of an Isothiocyanato Derivative for Labeling of Proteins with a Near–Infrared Chromophore, *Journal of Organic Chemistry;* 57, pp. 4578–4580, 1992.
Harada, T., Indolenine cyanine dyes, *Chemical Abstracts*, 121, Abstract No. 233080h, JP–06145539, p. 138, 1994.
Lipowska, M. et al., New Near–Infrared Cyanine Dyes For Labelling Of Proteins, *Synthetic Communications*, 23(21), pp. 3087–3094, 1993.
Williams; R. M. et al., Comparison of Covalent and Non-covalent Labeling with Near–Infrared Dyes for the High-Performance Liquid Chromatographic Determination of Human Serum Albumin, *Analytical Chemistry*, 65, pp. 601–605.

Williams, Lipowska, Patonay & Strekowski, Comparison of Covalent and Noncovalent Labeling with Near–Infrared Dyes for the High–Performance Liquid Chromatographic Determination of Human Serum Albumin, *Anal. Chem.*, 65, 601–605, 1993.

*Primary Examiner*—Charles L. Bowers, Jr.
*Assistant Examiner*—Christopher G. Young

[57] ABSTRACT

A novel dye and photographic element comprising the dye are detailed. The dye is especially useful as an antihalation dye in a photographic element. A particularly preferred embodiment is provided in a photographic element comprising an absorbing amount of the dye:

$$R^4\diagdown\underset{R^5}{\overset{X_1}{\diagup}}\hspace{-2pt}\underset{\underset{R^1}{|}}{\overset{+}{N}}\hspace{-4pt}\diagdown-CH=CH-\hspace{-4pt}\underset{\underset{R^3}{|}}{\overset{(CH_2)_n}{\diagup\diagdown}}\hspace{-4pt}=CH-CH=\hspace{-4pt}\underset{\underset{R^2}{|}}{\overset{X_2}{\diagup}}\hspace{-2pt}\diagdown\hspace{-4pt}\underset{R^7}{\diagup}R^6 \quad Q^-$$

wherein $X^1$, $X^2$ independently represents —$CR^8R^9$—, —S—, —Se—, —$NR^{10}$—, —CH=CH— or —O—;

$R^1$ and $R^2$ independently represent alkyl of 1 to 10 carbons or substituted alkyl of 1 to 10 carbons;

$R^3$ represents a ring chosen from the set consisting of aromatic ring of 6 or 10 carbons, substituted aromatic ring of 6 or 10 carbons, a heterocyclic ring and a substituted heterocyclic ring;

$R^4$, $R^5$, $R^6$ and $R^7$ independently represent hydrogen, alkyl of 1–10 carbons, substituted alkyl of 1–10 carbons;

$R^8$, $R^9$ independently represent alkyl of 1–10 carbons, substituted alkyl of 1–10 carbons, aromatic ring of 6 or 10 carbons, substituted aromatic ring of 6 or 10 carbons;

$R^{10}$ represents an alkyl of 1–10 carbons, substituted alkyl of 1–10 carbons, aromatic ring of 6 or 10 carbons, substituted aromatic ring of 6 or 10 carbons;

Q represents a counterion; and n is an integer chosen from 2 and 3.

6 Claims, No Drawings

PHOTOGRAPHIC ELEMENT WITH ETHER DYES FOR NEAR-INFRARED ANTIHALATION

RELATED APPLICATION

The present application is a continuation-in-part of Ser. No. 08/195,068, filed Feb. 14, 1994.

FIELD OF INVENTION

This invention relates to a photographic element which is particularly well suited for use with a near-infrared laser. More specifically, this invention relates to a unique dye which can be used in the photographic element. Even more specifically this invention relates to the use of these unique dyes in an antihalation layer of a photographic element.

BACKGROUND OF THE INVENTION

It is well known in the art of photographic science to add dyes to the structure of a photographic element in such a way as to absorb deleterious light. The dye can be located in several positions including: between the exposure source and the photosensitive emulsion; between the photosensitive emulsion and the support; and on the opposite side of the support to inhibit halation. Specific applications are illustrated, for example, in *Research Disclosure*, No. 308, December 1989, Item 308119.

Antihalation is particularly important when a film is exposed with a laser such as in the use of long wavelength laser films for medical imaging. The high intensity of long wavelength light (i.e. near-infrared) emitted by the laser is difficult to filter completely. If high levels of a dye are used it is typically difficult to remove the dye during processing and the result is a coloration, or dye stain, which is undesirable.

The development of the gallium-arsenic semiconductor laser, or diode laser, is expected to extend the use of lasers for medical imaging into the wavelength range of 780–830 nm. This application requires a film which is sensitive in this wavelength range and has an antihalation layer which absorbs in this region and is stable with time. Provided herein is a novel class of dyes which absorb throughout the near-infrared region and are well suited for use as an antihalation dye.

SUMMARY OF THE INVENTION

A novel dye is provided which has excellent absorption characteristics in the wavelength range of 780–830 nm.

A particular advantage is the solubility of these dyes as evidenced by their excellent properties as art antihalation dye in photographic elements.

These and other advantages are provided in a dye suitable for use as an antihalation dye in a photographic element chosen from the set consisting of:

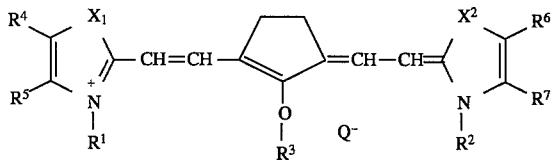

wherein
$X^1$, $X^2$ independently represents —$CR^8R^9$—, —S—, —Se—, —$NR^{10}$—, —CH=CH— or —O—

$R^1$ and $R_2$ independently represent alkyl of 1 to 10 carbons or substituted alkyl of 1 to 10 carbons;

$R^3$ represents a ring chosen from the set consisting of: aromatic ring of 6 or 10 carbons, substituted aromatic ring of 6 or 10 carbons, a heterocyclic ring and a substituted heterocyclic ring;

$R^4$, $R^5$, $R^6$ and $R^7$ independently represent hydrogen, alkyl of 1–10 carbons, substituted alkyl of 1–10 carbons, $R^4$ and $R^5$ taken together or $R^6$ and $R^7$ taken together may represent the atoms necessary to form a 5 or 6-membered aliphatic ring, an aromatic six-membered ring, an aromatic 10-membered ring, a substituted aromatic six-membered ring, or a substituted aromatic 10-membered ring;

$R^8$, $R^9$ independently represent hydrogen, alkyl of 1–10 carbons, substituted alkyl of 1–10 carbons, aromatic ring of 6 or 10 carbons, substituted aromatic ring of 6 or 10 carbons;

$R^{10}$ represents an alkyl of 1–10 carbons, substituted alkyl of 1–10 carbons, aromatic ring of 6 or 10 carbons, substituted aromatic ring of 6 or 10 carbons;

Q represents a counterion; and

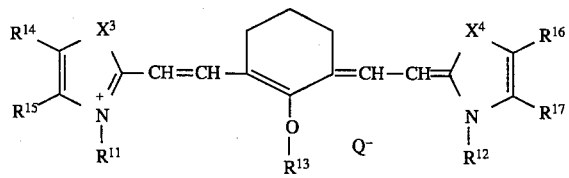

wherein:

$X^3$, $X^4$ independently represent —S—, —Se—, —$NR^{18}$—, —CH=CH— or —O—;

$R^{11}$ and R 12 independently represent alkyl of 1 to 10 carbons or substituted alkyl of 1 to 10 carbons;

$R^{13}$ represents a ring chosen from the set consisting of aromatic ring of 6 or 10 carbons, substituted aromatic ring of 6 or 10 carbons, heterocyclic ring and a substituted heterocyclic ring;

$R^{14}$, $R^{15}$, $R^{16}$ and $R^{17}$ independently represent hydrogen, alkyl of 1–10 carbons, substituted alkyl of 1–10 carbons, $R^{14}$ and R 15 taken together or $R^{16}$ and $R^{17}$ taken together may represent the atoms necessary to form a 5 or 6-membered aliphatic ring, an aromatic six-membered ring, an aromatic 10-membered ring, a substituted aromatic six-member ring or a substituted aromatic 10-member ring;

$R^{18}$ represents an alkyl of 1–10 carbons, substituted alkyl of 1–10 carbons, aromatic ring of 6 or 10 carbons, substituted aromatic ring of 6 or 10 carbons;

Q is defined above.

A particular advantage of these dyes is their ability to act as an antihalation dye with minimal dye staining as provided in a photographic element comprising an absorbing amount of the dye:

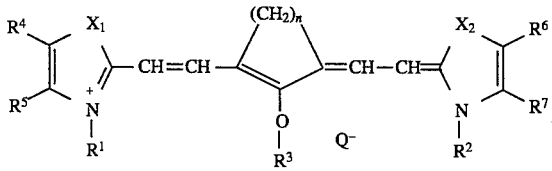

wherein $X^1$, $X^2$ independently represent —$CR^8R^9$—, —S—, —Se—, —$NR^{10}$—, —CH=CH— or —O—;

$R^1$ and $R^2$ independently represent alkyl of 1 to 10 carbons or substituted alkyl of 1 to 10 carbons;

$R^3$ represents a ring chosen from the set consisting of aromatic ring of 6 or 10 carbons, substituted aromatic ring of 6 or 10 carbons, a heterocyclic ring and a substituted heterocyclic ring;

$R^4$, $R^5$, $R^6$ and $R^7$ independently represent hydrogen, alkyl of 1–10 carbons, substituted alkyl of 1–10 carbons;

$R^8$, R9 independently represent hydrogen, alkyl of 1–10 carbons, substituted alkyl of 1–10 carbons, aromatic ring of 6 or 10 carbons, substituted aromatic ring of 6 or 10 carbons;

$R^{10}$ represents an alkyl of 1–10 carbons, substituted alkyl of 1–10 carbons, aromatic ring of 6 or 10 carbons, substituted aromatic ring of 6 or 10 carbons;

Q represents a counterion; and n is an integer chosen from 2 and 3.

DETAILED DESCRIPTION OF THE INVENTION

Inventive dyes are defined by Formula 1 or Formula 2:

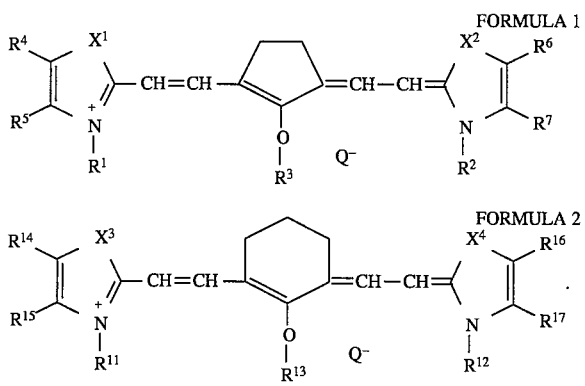

Referring specifically to Formula 1:

$X^1$, $X^2$ independently represents —$CR^8R^9$—, —S—, —Se—, —$NR^{10}$—, —CH=CH— or —O—. Preferably $X^1$, $X^2$ independently represent—$CR^8R^9$, —S—, —O—. Most
preferably $X^1$ or $X^2$ independently represents $CR^8R^9$.

$R^1$ and $R^2$ independently represent alkyl of 1 to 10 carbons or substituted alkyl of 1 to 10 carbons. Preferably $R^1$ or $R^2$ independently represent alkyl of 1–5 carbons, or substituted alkyl of 1–5 carbons. Most preferable is a substituted alkyl of 3–5 carbons.

$R^3$ represents a ring chosen from the set consisting of aromatic ring of 6 or 10 carbons, substituted aromatic ring of 6 or 10 carbons, a heterocyclic ring and a substituted heterocyclic ring. $R^4$, $R^5$, $R^6$ and $R^7$ independently represent hydrogen, alkyl of 1–10 carbons, substituted alkyl of 1–10 carbons. $R^4$ and $R^5$ taken together or $R^6$ and $R^7$ taken together may represent the atoms necessary to form a 5 or 6membered aliphatic ring, an aromatic six-membered ring, an aromatic 10-membered ring, a substituted aromatic six-member ring or a substituted aromatic 10-member ring. Preferably $R^4$ and $R^5$ or $R^6$ and $R^7$ can be taken together to represent an aromatic ring or substituted aromatic ring. Most preferably $R^4$ and $R^5$ or $R^6$ and $R^7$ represents a substituted aromatic ring of 6 or 10 carbon atoms.

$R^8$, $R^9$ independently represent hydrogen, alkyl of 1–10 carbons, substituted alkyl of 1–10 carbons, aromatic ring of 6 or 10 carbons, substituted aromatic ring of 6 or 10 carbons. Preferably $R^8$ and $R^9$ independently represent alkyl of 1–3 carbons.

$R^{10}$ represents an alkyl of 1–10 carbons, substituted alkyl of 1–10 carbons, aromatic ring of 6 or 10 carbons, substituted aromatic ring of 6 or 10 carbons. Preferably $R^{10}$ represents alkyl of 1–3 carbons.

Q is a counterion preferably chosen from the set consisting of alkyl sulfonate of 1–10 carbons, substituted alkyl sulfonate of 1–10 carbons, halide, alkali earth metal, alkyl amine of 1–12 carbons, substituted alkyl amine of 1–12 carbons, tosylate, substituted tosylate or combinations thereof. Most preferably the counterion is chosen from the set consisting of $CF_3SO_3$—, Cl—, Na+, $(CH_3CH_2)_3NH+$, and p—$CH_3C_6H_4SO_3$—.

A particularly preferred compound is obtained when $X^1$ or $X^2$ is chosen from the set consisting of $CR^8R^9$, S or $NR^{10}$. Most preferred is $X^1$ or $X^2$ being $CR^8R^9$.

Referring Specifically to Formula 2.

$X^3$, $X^4$ independently represents —S—, —Se—, —$NR^{18}$—, —CH=CH— or —O—.

$R^{11}$ and $R^{12}$ independently represent alkyl of 1 to 10 carbons or substituted alkyl of 1 to 10 carbons. Preferably $R^{11}$ and $R^{12}$ independently represent alkyl of 1–5 carbons or substituted alkyl of 1–5 carbons. Most preferred for $R^{11}$ and $R^{12}$ is a substituted alkyl of 3–5 carbons.

$R^{13}$ represents a ring chosen from the set consisting of aromatic ring of 6 or 10 carbons, substituted aromatic ring of 6 or 10 carbons, heterocyclic ring and a substituted heterocyclic ring. Preferably $R^{13}$ represents a substituted aromatic ring of 6 carbons.

$R^{14}$, $R^{15}$, $R^{16}$ and $R^{17}$ independently represent hydrogen, alkyl of 1–10 carbons, substituted alkyl of 1–10 carbons, $R^{14}$ and $R^{15}$ taken together or $R^{16}$ and $R^{17}$ taken together may represent the atoms necessary to form a 5 or 6-membered aliphatic ring, an aromatic six-membered ring, an aromatic 10-membered ring, a substituted aromatic six-member ring or a substituted aromatic 10-member ring. Preferably $R^{14}$ and $R^{15}$ or $R^{16}$ and $R^{17}$ can be taken together to represent an aromatic six-membered ring, substituted aromatic six-membered ring, an aromatic 10-membered ring or a substituted aromatic 10-membered ring. Most preferably $R^{14}$ and $R^{15}$ or $R^{16}$ and $R^{17}$ represent a substituted aromatic 10-membered ring.

$R^{18}$ represents an alkyl of 1–10 carbons, substituted alkyl of 1–10 carbons, aromatic ring of 6 or 10 carbons, substituted aromatic ring of 6 or 10 carbons.

A particularly preferred compound is obtained when $R^1$, $R^2$, $R^{11}$ or $R^{12}$, independently represent an alkyl of 1 to 5 carbons and most preferred is a dye chosen from Formula 1 or 2 wherein $R^1$, $R^2$, $R^{11}$ or $R^{12}$ is substituted with a sulfonate group or a carboxyl group.

The term "heterocyclic ring" refers specifically to the type present in photographic emulsions. More specifically heterocyclic ring refers to a heterocyclic nuclei comprising 5 to 6 atoms in a heterocyclic ring. Preferably, $R^3$ or $R^{13}$ represents a heterocyclic ring composed of atoms selected from the group consisting of C, N, O, S and Se. Specifically preferred examples of heterocyclic rings of the types present in photographic emulsions are chosen from the set consisting of:

the thiazole series; e.g. thiazole, 4-methylthiazole, 4-phenylthiazole, 5-methylthiazole, 5-phenylthiazole, 4,5-dimethylthiazole, 4,5I-diphenylthiazole, 4-(2-thienyl)thiazole;

the benzothiazole series; e.g., benzothiazole, 4-chlorobenzothiazole, 5-chlorobenzothiazole, 6-chlorobenzothiazole, 7-chlorobenzothiazole, 4methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole;

the naphthothiazole series; e.g., naphtho[1,2]-thiazole, naphtho[2, 1 ]thiazole, 5-methoxynaphtho-[2, 1 ]-thiazole, 5-ethoxynaphtho[2, 1 ]thiazole, 8-methoxynaphtho[1,2]thiazole, 7-methoxynaphtho[1,2]thiazole;

the thianaphtheno-7', 6', 4,5-thiazole series; e.g. 4'-methoxythianaphtheno-7', 6', 4,5,thiazole;

the oxazole series; e.g., 4-methyloxazole, 5-methyloxazole, 4-phenyloxazole, 4,5-diphenyloxazole, 4-ethyloxazole, 4,5-dimethyloxazole, 5-phenyloxazole;

the benzoxazole series; e.g., benzoxazole, 5-chlorobenzoxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole;

the naphthoxazole series, e.g., naphtho[1,2oxazole, naphtho[2,1 ]oxazole;

the selenazole series; e.g., 4-methylselenazole, 4-phenylselenazole;

the benzoselenazole series; e.g., benzoselenazole, 5-chlorobenzoselenazole, 5-methylbenzoselenazole, 5-methoxybenzoselenazole, 5-hydroxybenzoselenazole, tetrahydrobenzoselenazole;

the naphthoselenazole series; e.g., naphthol[1,2]selenazole, naphtho[2,1]selenazole; the thiazoline series; e.g., thiazoline, 4-methylthiazoline; the 2-quinoline series; e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline;

the 4-quinoline series; e.g., quinoline, 6-methoxyquinoline, 7-methoxyquinoline, 7-methylquinoline, 8-methylquinoline;

the 1-isoquinoline series; e.g., isoquinoline, 3,4-dihydroisoquinoline;

the 3-isoquinoline series; e.g., isoquinoline;

the benzimidazole series; e.g., 1,3-diethylbenzimidazole, 1-ethyl-3-phenylbenzimidazole;

the 3,3-dialkylindolenine series; e.g., 3,3-dimethylindoline, 3,3,5-trimethylindolenine, 3,3,7-trimethylindolenine;

the 2-pyridine series; e.g., pyridine, 5-methylpyridine; and the 4-pyridine series; e.g., pyridine;

the 3,3-dialkylbenz[e]indole series; e.g., 3,3-dimethylbenz[e]indole;

the tetrazole series: e.g., 1-phenyltetrazole, 1-methyltetrazole;

the triazole series: e.g., 1-phenyl-triazole, 1-methyltriazole;

the pyrimidine series: e.g., pyrimidine;

the thiadiazole series: e.g., 1,3,4-thiadiazole.

Preferred compounds are obtained when $R^3$ or $R^{13}$ is chosen from the set consisting of:

the thiazole series; e.g. thiazole, 4-methylthiazole, 4-phenylthiazole, 5-methylthiazole, 5-phenylthiazole, 4,5-dimethylthiazole, 4,5I-diphenylthiazole, 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole;

the benzoxazole series; e.g., benzoxazole, 5-chlorobenoxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole;

the benzimidazole series; e.g., 1,3-diethylbenzimidazole, 1-ethyl-3-phenylbenzimidazole;

the tetrazole series: e.g., 1-phenyltetrazole, 1-methyltetrazole;

the triazole series: e.g., 1-phenyl-triazole, 1-methyltriazole;

the pyrimidine series: e.g., pyrimidine;

the thiadiazole series: e.g., 1,3,4-thiadiazole.

The term "alkyl" is used herein in a manner consistent with the art to describe a straight chain or branched hydrocarbon group. The term "aryl" is used herein in a manner consistent with the art to describe an aromatic cyclic six-membered ring such as a phenyl group or an aromatic 10-membered ring such as a naphthalene group. The term "substituted alkyl", as used herein, specifically refers to a straight or branched alkyl which is substituted with at least one group such as sulfonate, carboxyl, hydroxy, halogen, carbonylalkyl, amine, aryl or -OL, where L is an alkyl or substituted alkyl of 1–10 carbons. The most preferred substituent for alkyl is sulfonate or carboxyl. The term "substituted aryl", as used herein, specifically refers to a six- or 10-membered ring which is substituted with at least one group such as sulfonate, carboxyl, hydroxy, halogen, carbonylalkyl, amine, aryl or -OL, where L is an alkyl or substituted alkyl of 1–10 carbons. The most preferred substituent for aryl is sulfonate or carboxylate. The term aromatic six-membered ring refers to the atoms chosen from C, N, O and S necessary to form an aromatic ring or substituted aromatic ring. Specifically preferred examples include phenyl, pyridine, pyrimidine, pyrazine, and pyridazine. The term aromatic 10-membered ring refers to the atoms chosen from C, N, O and S necessary to from an aromatic 10-membered ring or substituted aromatic 10-member membered ring. Specific examples include quinoline, naphthalene, phthalazine, naphthyridine, quinoxaline, quinazoline, cinnoline, pteridine. The term 5 or 6-membered aliphatic ring refers to the elements C, N, O and S necessary to form an aliphatic ring or substituted aliphatic ring. Specific examples include cyclopentane, cyclopentene, cyclohexane, cyclohexene, furan, pyran, pyrrole, pyrroline, pyrrolidine, piperidine, piperazine.

When the dyes of the present invention are used in an antihalation layer it is most preferable that at least one group be substituted with a solubilizing moeity such as sulfonate, carboxylate or the like.

Exemplary dyes are provided in Tables 1–4. Their properties are provided in Tables 5–7. This list is not considered to be exhaustive or limiting in any way.

$R^8$ and $R_9$ independently represent an alkyl of 1–3 carbons; n is the integer 3.

The most preferred dyes for use in an antihalation layer are represented by D-20 and D-24 as described in Table 3.

Dyes described are prepared by known organic preparative techniques in accordance with the following synthetic reaction:

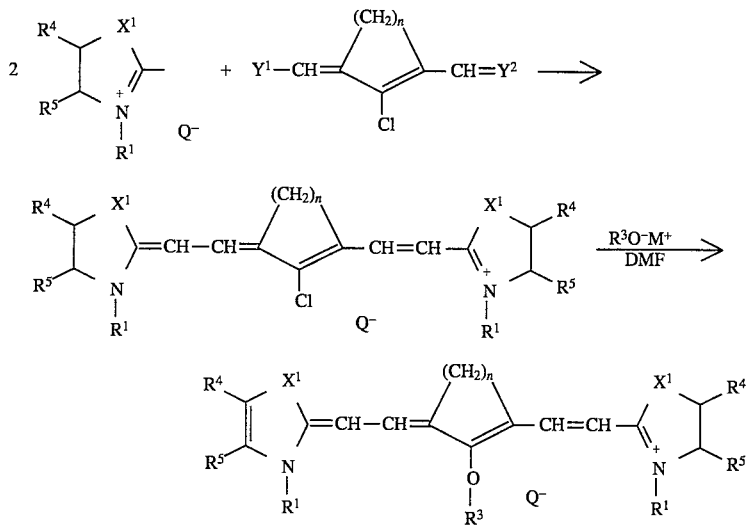

The dyes of the present invention are particularly preferred when used as an anti-halation dye in a photographic element. Particularly preferred is a photographic element comprising a dye of Formula 3:

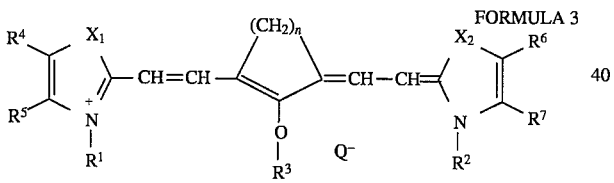

FORMULA 3 wherein n is an integer chosen from 2 and 3; $X^1$, $X^2$ and $R^1$–$R^7$ are defined above for Formula 1. Particularly preferred is a photographic element comprising an anti-halation amount of at least one dye defined by Formula 1 or Formula 2.

Particularly preferred for use in an antihalation layer of a photographic film is a dye of Formula 3 where n represents the integer 3. A dye which is particularly preferred is obtained by Formula 3 wherein:

$X^1$ and $X^2$ represent $CR^8R^9$;

$R^1$ represents an alkyl of 1–4 carbons, or an alkyl of 1–4 carbons substituted with an —$SO_3$— group;

$R^2$ represents an alkyl of 1–4 carbons, or an alkyl of 1–4 carbons substituted with an —$SO^3$— group;

$R^3$ represents an aromatic ring of 6 carbons or a substituted aromatic ring of 6 carbons; $R^4$ and $R^5$ are taken together to form a 10membered aromatic ring or a 10-membered aromatic ring substituted with at least one —$SO_3$— group;

$R^6$ and $R^7$ are taken together to form a 10-membered aromatic ring or a 10-membered aromatic ring substituted with at least one —$SO_3$— group;

wherein $R^1$, $R^3$, $R^4$, $R^5$, X1 and Q are as defined above and n is an integral chosen from 2 and 3. One of ordinary skill in the art would appreciate that the unsymmetrical dye could be prepared in an analogous manner by substituting one mole of the cyclic amine with a second cyclic amine as known in the art.

The choice of cyclic amine represented by:

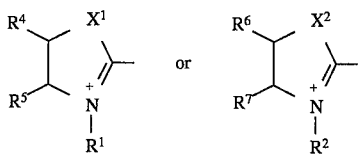

will determine the terminal rings of the final dye. As such when $X^1$ or $X^2$ is intended to be $CR^8R^9$ the proper starting material is an appropriately substituted pyrrole or indole; when $X^1$ or $X^2$ is intended to be —S— the proper starting material is an appropriately substituted thiazole, benzothiazole or naphthothiazole; when $X^1$ or $X^2$ is intended to be —Se— the proper starting material is an appropriately substituted selenazole, benzoselenazole or naphthselenazole; when $X^1$ or $X^2$ is intended to be —NR— the proper starting material is an appropriately substituted imidazole, benzimidazole, or naphthimidazole; when $X^1$ or $X^2$ is intended to be —CH=CH— the proper starting material is an appropriately substituted pyridine, quinoline or benzquinoline; and when $X^1$ or $X^2$ is intended to be —O— the proper starting material is an appropriately substituted oxazole, benzoxazole or naphthoxazole.

The antihalation layer comprises an absorbing amount of the antihalation dye represented by Formula 3 and can be present (1) on the opposite side of the support from a photosensitive layer; (2) between the photosensitive layer and the support; (3) supra to a photosensitive layer or (4)

between photosensitive layers. Other conventional layers, such as, for example, subbing layers, antistatic layers, overcoats, etc., may be present. These conventional layers may be present either between the photosensitive layer and/or the antihalation layer and the support, between the photosensitive layer and the antihalation layer in the case in which both layers are present on the same side of the support, or on the side of the photosensitive layer and/or the antihalation layer away from the support.

The antihalation layer also comprises a vehicle. Such vehicles are well-known in the art and include hyrophilic colloids, such as, for example a gelatin, which may be derived from a variety of sources, such as, for example, cattle bone, pigskin, etc.; gelatin derivatives, such as, for example, phathalated gelatin, acetylated gelatin, etc.; polysaccharides, such as, for example, dextran, etc.; synthetic polymers, such as, for example, poly(vinyl alcohol) and water soluble partially hydrolyzed poly(vinyl acetate); acrylic polymers; polymers of alkyl and sulfoalkyl acrylates and methacraylates; polyamines; poly(vinyl acetals), such as, for example, poly(vinyl acetal), etc.; poly(vinyl ethers); etc. Gelatin is preferred.

To prepare the antihalation layer the dye can be dissolved in methanol, ethanol, water, or another suitable solvent, and added to an aqueous dispersion or melt of the vehicle. "An absorbing amount of the antihalation dye" means an amount of dye at least sufficient to impart antihalation properties to the layer yet not sufficient to cause any deleterious side effects. For antihalation layers an optical density of about 0.40 at the wavelength used for imaging is preferred. Using techniques well known to those skilled in the art, the concentration of dye required to attain this optical density can be calculated from the thickness of the antihalation layer and the absorption spectrum of the antihalation dye, which can be determined by conventional spectrophotometric techniques. The dyes are typically present in the antihalation layer in an amount of 0.005 to 0.05 g/m2, preferably 0.01 to 0.03 g/m2.

The photosensitive layer, or layers, of the photosensitive element comprises a component which is responsive to radiation. The photosensitive component is, preferably, a conventional gelatino silver halide emulsion or a hydrophilic colloid silver halide emulsion. Conventional photographic silver halide emulsions employing any of the commonly known halides, such as silver chloride, silver bromide, silver iodide, and mixtures thereof, may be used. These may be of varied content and may be negative and/or positive working.

The radiation sensitive layer also comprises a vehicle. Such vehicles are well-known in the art and include the materials useful as vehicles for the antihalation layer, described above. A preferred vehicle is gelatin.

The layer may be hardened by addition of a conventional hardening agent, such as, for example, formaldehyde, glyoxal. Conventional additives may also be present for specific purposes, such as, for example, to enhance and stabilize the response of the emulsion.

The preparation of silver halide emulsions is well known in the art. Silver halide emulsions, their preparation, and the preparation of photosensitive layers therefrom, are described in:*Research Disclosure*, Item 17643, December 1978; *Research Disclosure*, Item 18431, August 1979; *Research Disclosure*, Item 22534, January, 1983; and Abbot, U.S. Pat. No. 4,425,425, the disclosures of which are incorporated by reference.

The photosensitive component may be sensitized to near—infrared by techniques known in the art. Sensitization of silver halide may be accomplished with chemical sensitizers, such as, for example, gold compounds, iridium compounds, or with other group VIII metal compounds, or with spectral sensitizing dyes, such as for example, cyanine dyes, merocyanine dyes, styryls, etc.

The element may comprise any of a number of the other conventional additives and layers, such as are disclosed in any of the above incorporated references. These include, for example, optical brightners, antifoggants, emulsion stabilizers, image stabilizers, filter dyes, intergrain absorbers, light—scattering materials, gelatin hardeners, coating aids, surfactants, overcoat layers, interlayer and barrier layers, antistat layers, plasticizers and lubricants, matting agents, development inhibitor-releasing compounds, etc. The element can be prepared by coating the layers onto the support using coating techniques which are conventional in the art.

The film support may be any suitable transparent plastic. For example, the cellulosic supports, e.g. cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned. When polyethylene terephthalate is manufactured for use as a photographic support, it is preferable to use a mixed polymer subbing composition such as that taught by Rawlins, U.S. Pat. No. 3,567,452, Miller, U.S. Pat. Nos. 4,916,011 and 4,701,403, Cho, U.S. Pat. Nos. 4,891,308 and 4,585,730 and Schadt, U.S. Pat. No. 4,225,665. Upon completion of stretching and application of subbing composition, it is necessary to remove strain and tension in the base by a heat treatment comparable to the annealing of glass.

The following detailed synthetic procedures are not intended to be limiting in any way. Other compounds described herein can be prepared in an analogous manner using standard organic synthetic procedures as known in the art.

STARTING MATERIALS

The following starting materials are used in the synthesis of the dyes.

Compound A

3H-Indolium, 2-[2-[2-chloro-3-[(1,3-dihydro- 1,3,3-trimethyl-2H-indol2-ylidene) ethylidene]-1-cyclopenten-1-1-yl] ethenyl]-1,3,3-trimethyl-, salt with trifluoromethanesulfonic acid (1:1) is disclosed in Laganis and West, U.S. Pat. No. 4,882,265.

Compound B

Compound C (1.72 g, 0.05 mol), 6-sulfo-1-(4-sulfobutyl)-2,3,3-trimethyl-1H-benz(e)indolium, inner salt (NKX-1632 from Nippon Kanko Shisiko, 4.13 g, 0.01 mol), and 40 ml dimethylformamide were mixed together. Acetic anhydride (3 ml) was added, followed by 5.04 g (0.055 mol) triethylamine. The mixture was stirred at room temperature for 24 hours. The reaction mixture was filtered and the filtrate was poured into 250 ml ethyl acetate. After stirring at least one hour, the mixture was filtered and the product reslurried in ethyl acetate. After filtering and drying, the yield was 2.60 g, mp 167°–195° C., λmax (methanol)-=845 nm (ε=177, 000).

Compound C

2-Chloro-3-(anilinomethylene)-1-(aniliniummethyl)-cyclopent-1-ene hydrochloride is disclosed by reference to Laganis and West, U.S. Pat. No. 4,882,265 and by reference to E.P. 0 420 012 A1.

Compound D

Compound E (0.43 g, 0.0025 mol), 7,9-disulfo-3-(4-sulfobutyl)-1,1,2-trimethyl-1H-benz(e)indolium, inner salt (NKX-1700 from Nippon Kankoh Shikiso, 2.52 g, 0.005 mol), and 20 ml dimethylformamide were mixed together. Acetic anhydride (1.5 ml) was added, followed by 2.02 g (0.02 tool) triethylamine. The mixture was stirred at room temperature for 25 hours. The reaction mixture was filtered to recover green dye. This was reslurried in ethyl acetate, filtered, and dried to yield 0.85 g, mp>350° C., λmax (methanol)=814 nm (ε=362,000). Additional less pure dye was obtain by pouring the reaction filtrate into 200 ml ethyl acetate, decanting the solvent and redissolving the residue in 200 ml methanol. This solution was treated with 3.0 g potassium acetate dissolved in 10 ml methanol and then poured into 800 ml ethyl acetate to yield 1.29 g additional dye.

Compound E

2-Chloro3-(hydroxymethylene)-1-formylcyclohex-1-ene is prepared as described in West and Fabricius, U.S. Pat. No. 5,107,063. Dimethylformamide (40 ml) and 40 ml dichloromethane were mixed and cooled to 5° C. Phosphorous oxychloride (33 ml) was dissolved in 40 ml dichloromethane and added dropwise to the dimethylformamide / dichloromethane solution at a rate maintain the temperature below 25° C. Cyclohexanone (9 g) was added and the mixture heated to reflux for 5 hours. After cooling to room temperature, the reaction mixture was poured into 200 ml of ice and allowed to sit overnight. The quenched mixture was filtered to collect 9.62 g yellow crystals, mp 128° C., λmax(methanol)=328 nm (ε =15,000).

Compound F 1,1,2-Trimethyl-1 H-benz(e)indole (10.45 g,0.03 mol), methyl tosylate (9.3 g,0.03 mol), and 40 ml o-xylene were refluxed together for 7 hours. The mixture was cooled to 90° C. and acetone added cautiously to dilute. Upon cooling to room temperature, the product was collected by filtration and then reslurried twice with 150 ml acetone to yield 17.25 g product, mp 208° C.

Compound G 1,1,2-Trimethyl-1 H-benzindole (184.47 g,0.88 mol) was heated with 91.8 ml liquid 1,4-butanesultone and 600 ml o-xylene at 144°–148C for 7.5 hours. The greenish solution was cooled to 70° C. before adding 200 ml acetone to dilute and induce crystallization. After cooling to 13° C., the product was collected by filtration, washed with acetone, and slurried twice in acetone. After filtering and drying, the yield was 193.10 g of quaternary salt, mp 222° C.

Compound H

Compound G, (171 g,0.05 mol), Compound C (86 g,0.25 mol), and 2000 ml dimethylformamide were mixed together. Acetic anhydride (1 00 ml) was added. To the stirred mixture was added 75.5 g (0.75 mol.) triethylamine. The mixture was carefully heated and held between 83°–90° C. for no more than 6 minutes. The reaction cooled quickly with an methanol-ice bath to −3° C. The mixture was filtered to remove unreacted starting material and the filtrate was then poured into 5000 ml of ethyl acetate. The mixture was chilled and stirred for at least three hours, then filtered, and the isolated product reslurried in ethyl acetate. After filtration and drying, the yield was 173.10 g, mp241° C., λmax(methanol) =845 nm (ε=250,000). A second crop of dye was recovered after letting the initial ethyl acetate quench sit overnight: 4.75 g, mp249° C., λmax(methanol)=845 nm (ε=289,000).

Compound I

Compound E (1.72 g,0.01 mol), 6-Sulfo-1-(4-sulfobutyl)2,3,3-trimethyl-1H-benzindolium, inner salt (NKX-1632 from Nippon Kanko Shikiso, 8.27 g, 0.02 mol), and 30 ml acetic acid were mixed together. Acetic anhydride (7 ml) was added, followed by 4.1 g (0.05 mol) anhydrous sodium acetate. The mixture was heated to reflux for 21 min., then cooled to room temperature and filtered. The filtrate was poured into 300 ml ethyl acetate and allowed to sit overnight. The solvent was decanted and replaced by fresh ethyl acetate. The mixture was agitated to break up the solid, filtered and dried. The yield was 9.20 g, mp>350° C., λmax(methanol)=821 nm (ε=226,000).

Compound J

Compound E (3.12 g,0.018 mol), Compound F (14.22 g,0.036 mol), and 54 ml acetic acid were mixed together. Acetic anhydride (12.6 ml) was added, followed by 2.94 g anhydrous sodium acetate. The mixture was heated to reflux for 2.5 hrs., then cooled to room temperature and filtered. The filtrate was poured into 800 ml ethyl ether and stirred for 45 minutes. The mixture was filtered and the product reslurried in 100 ml ethyl ether for 2.5 days. After filtering and drying, the yield was 14.91 g, mp220°–239° C., λmax (methanol)=813 nm (ε=153,000).

Compound K

Compound C (4.3 g,0.0125 mol), 5-Sulfo-1-(4-Sulfobutyl)-2,3,3-trimethylindolenium, inner salt (NKX-1653 from Nippon Kanko Shisiko, 9.38 g,0.025 mol), and 60 ml dimethylformamide were mixed together. Acetic anhydride (6.6 ml) was added, followed by 5.6 g (0.055 mol) triethylamine. The mixture was stirred at room temperature for 4.5 hours. The reaction mixture was filtered and the filtrate was poured into 200 ml ethyl acetate. After stirring at least one hour, the mixture was filtered and the product reslurried in ethyl acetate. After filtering and drying, the yield was 11.91 g, mp154°–187° C., λmax (methanol)=811 nm (ε=251,000).

Compound L

Compound C (3.44 g,0.01 mol), Compound F (7.9 g,0.02 mol), and 60 ml dimethylformamide were mixed together. Acetic anhydride (4.0 ml) was added, followed by 3.0 g (0.03 mol) triethylamine. The mixture was stirred at room temperature for 26 hours. The reaction mixture was filtered and the filtrate was poured into 350 ml water. After stirring at least 3 hours, the mixture was filtered and the product reslurried in water. After filtering and drying, the yield was 6.78 g, mp156°–167° C., λmax(methanol)=837 nm (ε=226, 000).

SYNTHESIS OF DYE COMPOUNDS

DYE D-2

4-Methoxyphenol (0.52 g, 0.0042 mol) in 20 ml dimethylformamide (DMF) was mixed with 2.8 g of 1.5M aqueous sodium hydroxide solution. Then Compound A (2.48 g,0.004 mol) was added. The absorption of the solution shifted from 797 nm to 767 nm. After stirring overnight, the reaction mixture was filtered and then poured into 200 ml 5% aqueous potassium carbonate solution. After stirring two hours, the mixture was filtered, washed with water, and the product dried to yield 2.73 g powder, mp95°–115 C., λmax= 763 nm (ε=190,000). Dye D-4

3-Dimethylaminophenol (0.58 g, 0.0042 mol) in 20 ml dimethylformamide (DMF) was mixed with 2.8 g of 1.5M aqueous sodium hydroxide solution. Then Compound A (2.48 g,0.004 mol) was added. The absorption of the solution shifted instantaneously from 797 nm to 778 nm. After stirring 3 hours, the reaction mixture was filtered and then poured into 200 ml 5% aqueous potassium carbonate solution. After stirring two hours, the mixture was filtered, washed with water, and the product dried to yield 2.51 g powder, mp137°–163° C., λmax=771 nm (ε =151,000). The product can be further purified by stirring with 20% aqueous KCl solution to give 2.14 g, mp148° C.

Dye D-5

4-Hydroxyphenylacetamide (0.63 g, 0.0042 mol) in 20 ml dimethylformamide (DMF) was mixed with 2.8 g of 1.5M aqueous sodium hydroxide solution. Then Compound A (2.48 g,0.004 mol) was added. The absorption of the solution shifted instantaneously from 797 nm to 774 nm. After stirring 40 minutes, the reaction mixture was filtered and then poured into 200 ml 5 % aqueous potassium carbonate solution. After stirring two hours, the mixture was filtered, washed with water, and the product dried to yield 2.51 g powder, mp dec. 148° C., $\lambda$max=772 nm ($\epsilon$=178,000). The product can be further purified by stirring with 20% aqueous KCl solution to give 2.30 g, mp140°–161° C., $\lambda$max=771 nm ($\epsilon$=125,000).

Dye D-6

Ethyl 4-hydroxybenzoate (0.70 g,0.0042 mol) in 20 ml dimethylformamide (DMF) was mixed with Compound A (2.48 g,0.004 mol). After a few minutes, 0.17 g sodium hydroxide in 1 ml water was added. After stirring overnight, the reaction mixture was filtered and then poured into 200 ml 5% aqueous potassium carbonate solution. After stirring two hours, the mixture was filtered, washed with water, and the product dried to yield 2.48 g powder, mp 119°–130° C., $\lambda$max=780 nm ($\epsilon$ =182,000).

Dye D7 4-Hydroxybenzaldehyde (0.98 g,0.008 tool) in 20 ml dimethylformamide (DMF) was mixed with 0.32 g of sodium hydroxide dissolved in 1 ml water. Then Compound A (2.48 g,0.004 mol) was added. The absorption of the solution shifted instantaneously from 797 nm to 787 rim. After stirring 1.5 hrs., the reaction mixture was filtered and then poured into 200 ml water. After sitting two hours, the mixture was decanted and the residual oil dissolved in acetone. The solution was poured into 500 ml of 1% aqueous potassium carbonate solution. After stirring for 2.5 hrs, the mixture was filtered to collect 2.24 g blue powder, mp 135°–140° C., $\lambda$max=780 nm ($\epsilon$=207,000).

Dye D-8

4-Hydroxybenzenesulfonic acid, sodium salt dihydrate (0.98 g,0.0042 mol) in 20 ml dimethylformamide (DMF) was mixed with 0.17 g sodium hydroxide dissolved in 1 ml water. Then Compound A (2.48 g,0.004 tool) was added. After stirring 2 hours, the reaction mixture was filtered, then poured into 200 ml 5% aqueous sodium carbonate solution. After stirring two hours, the mixture was filtered, washed with water, and the product dried to yield 2.00 g violet-brown powder, mp 184°–205° C., $\lambda$max=781 nm ($\epsilon$=138,000), 658 nm ($\epsilon$=60,000).

4-Hydroxybenzoic acid, sodium salt (0.32 g,0.002 mol) in 10 ml dimethylformamide (DMF) was mixed with 0.08 g sodium hydroxide in 1 ml water. Then Compound K (2.35 g,0.002 mol) was added with an additional 10 ml DMF. The mixture was stirred 29 hrs. at room temperature. The mixture was filtered and the filtrate then poured into 200 ml ethyl acetate. After stirring 3 hours, the mixture was filtered, reslurried in ethyl acetate, filtered, and the product dried to yield 2.06 g powder, mp 240°–257° C., $\lambda$max(methanol)= 795 nm ($\epsilon$=191,000).

DYE D-10

4,5-Dihydroxy-m-benzenedisulfonic acid, disodium salt (0.63 g,0.002 mol) in 10 ml dimethylformamide (DMF) was mixed with 0.08 g sodium hydroxide in 1 ml water. Then Compound K (2.35 g,0.002 mol) was added with an additional 10 ml DMF. The mixture was stirred 4.5 hrs. at room temperature and then heated to 50°–78° C. for 3 hours. The mixture was allowed to cool and stir overnight, then treated with an additional 0.08 g sodium hydroxide dissolved in 0.6 water. After stirring at room temperature 24 hours, the mixture was filtered and the filtrate then poured into 200 ml ethyl acetate. After stirring several hours, the mixture was filtered, reslurried in ethyl acetate, filtered, and the product dried to yield 1.73 g powder, mp dec290° C., $\lambda$max(methanol)=802 nm ($\epsilon$=114,000).

DYE D-11

4-Methoxyphenol (0.52 g,0.0042 mol) in 20 ml dimethylformamide (DMF) was mixed with 2.8 g of 1.5M aqueous sodium hydroxide solution. Then Compound L (2.96 g,0.004 mol) was added. The absorption of the solution shifted from 837 nm to 802 nm. After stirring 1.5 hrs, the reaction mixture was filtered and then poured into 200 ml 5% aqueous potassium carbonate solution. After stirring two hours, the mixture was filtered, washed with water, and the product dried to yield 3.35 g powder, mp dec120° C., $\lambda$max=790 nm ($\epsilon$=94,000). The dye was further purified by stirring twice with 40 ml of 20% aqueous KCl to yield 2.19 g, mp172° C., $\lambda$max=800 nm ($\epsilon$=79,000).

DYE D-12

4-Methoxyphenol (0.23 g,0.0019 mol) in 20 ml dimethylformamide (DMF) was mixed with 1.23 g of 1.5M aqueous sodium hydroxide solution. Then Compound B (2.09 g,0.0017 mol) was added. After stirring 23 hrs. at room temperature, the reaction mixture was heated to 40° C. for 9 hrs. An additional 1.2 g of 1.5M aqueous sodium hydroxide solution was added and the mixture allowed to stir 2.5 days at room temperature. The reaction mixture was filtered and then poured into 200 ml ethyl acetate. After stirring, the mixture was filtered, reslurried in ethyl acetate, and the product dried to yield 0.77 g powder, mp>350° C., $\lambda$max= 811 nm ($\epsilon$=226,000).

DYE D-13

4-Methoxyphenol (0.27 g,0.0022 mol) in 20 ml dimethylformamide (DMF) was mixed with 1.47 g of 1.5M aqueous sodium hydroxide solution. Then Compound H (1.83 g,0.002 mol) was added. After stirring 24 hrs., the reaction mixture was filtered and then poured into 200 ml ethyl acetate. After stirring two hours, the mixture was filtered, reslurried in ethyl acetate, and the product dried to yield 1.87 g powder, mp dec151° C., $\lambda$max=815 nm ($\epsilon$=189,000).

DYE D-14

Ethyl 4-hydroxybenzoate (0.34 g,0.0021 mol) in 20 ml dimethylformamide (DMF) was mixed with 1.4 g of 1.5M aqueous sodium hydroxide solution. Then Compound L (1.48 g,0.002 mol) was added. The absorption of the solution shifted from 837 nm to 823 nm. After stirring 2 hrs, the reaction mixture was filtered and then poured into 200 ml 5% aqueous sodium carbonate solution. After stirring one hour, the mixture was filtered, washed with water, and the product dried to yield 1.32 g powder, mp150°–172° C., $\lambda$max=822 nm ($\epsilon$=115,000).

DYE D-5

2-Hydroxyethoxyphenol (0.62 g,0.004 mol) in 40 ml dimethylformamide (DMF) was mixed with 2.6 g of 1.5M aqueous sodium hydroxide solution. Then Compound J (3.02 g,0.004 mol) was added. The mixture was heated at ~40° C. for 7 hours. The reaction mixture was cooled, filtered, and then poured into 200 ml 5% aqueous potassium carbonate solution. After stirring one hour, the mixture was filtered, washed with water, and the product dried to yield 1.80 g powder, mp177°–186° C., $\lambda$max=802 nm ($\epsilon$=192,000).

DYE D-17

Ethyl 4-hydroxybenzoate (0.68 g,0.004 mol) in 40 ml dimethylformamide (DMF) was mixed with 2.6 g of 1.5M aqueous sodium hydroxide solution. Then Compound J (3.02 g,0.004 mol) was added. The mixture was heated at ~48°–50 C. for 10 hours. The reaction mixture was cooled, filtered, and then poured into 200 ml 5% aqueous potassium carbonate solution. After stirring one hour, the mixture was filtered, washed with water, and the product dried to yield 1.90 g powder, mp139°–163° C., λmax=803 nm ($\epsilon$=193,000). The dye was further purified by stirring two hours with 40 ml of 20% aqueous potassium chloride. After filtering, washing with water, and drying, the yield was 1.70 g, mp156°–165° C., λmax=803 nm ($\epsilon$=166,000).

DYE D-18

4-Hydroxybenzaldehyde (0.49 g,0.004 mol) in 40 ml dimethylformamide (DMF) was mixed with 2.6 g of 1.5M aqueous sodium hydroxide solution. Then Compound J (3.02 g,0.004 mol) was added. The mixture was heated at ~40°–50° C. for 7 hours. The reaction mixture was cooled, filtered, and then poured into 200 ml 5 % aqueous potassium carbonate solution. After stirring one hour, the mixture was filtered, washed with water, and the product dried to yield 1.78 g powder, mp162°–180° C., λmax-803 nm ($\epsilon$=211,000). The dye was further purified by stirring two hours with 40 ml of 20% aqueous potassium chloride. After filtering, washing with water, and drying, the yield was 1.72 g, mp 160°–171° C., λmax=804 nm ($\epsilon$=187,000).

DYE D-19

Phenol (0.20g,0.0022 mol) in 20 ml dimethylformamide (DMF) was mixed with 2.8 ml of 1.5M aqueous sodium hydroxide solution. Then Compound I (2.11 g,0.002 mol) was added. After stirring 1.5 hrs. at room temperature, the reaction mixture was heated to 80° C. for 2 hrs. The mixture was cooled, filtered, and then poured into 300 ml ethyl acetate. After stirring overnight, the mixture was filtered, reslurried in ethyl acetate, and the product dried to yield 2.39 g powder, mp>350° C., $\mu$max=806 nm ($\epsilon$=85,000).

DYE D-20

4Hydroxybenzenesulfonic acid dihydrate (0.25 g,0.001 mol) in 20 ml dimethylformamide (DMF) was mixed with 0.73 g of 1.5M aqueous sodium hydroxide solution. Then Compound D (1.67 g,0.001 mol) was added. After stirring 23 hrs. at room temperature, an additional 0.14 g of 1.5M aqueous sodium hydroxide solution was added and the reaction mixture was heated to 60°–76° C. for 8 hrs. After cooling overnight, the reaction mixture was filtered and then poured into 200 ml ethyl acetate. After stirring overnight, the mixture was filtered, reslurried in ethyl acetate, and the product dried to yield 1.16 g powder, mp>350° C., $\mu$max=810 nm ($\epsilon$=221,000).

DYE D-21

4-Hydroxyphenylacetic acid (0.32 g,0.0021 mol) in 10 ml dimethylformamide (DMF) was mixed with 2.8 m; 1.5M aqueous sodium hydroxide solution. Then Compound I (2.11 g,0.002 mol) was added. The mixture was stirred 3 hrs at room temperature and then warmed to 18 60°–95° C. for 6 hrs. total. The mixture was cooled, filtered, and the filtrate then poured into 200 ml ethyl acetate. After setting one hour, the solvent was decanted and the residue retreated with fresh ethyl acetate to give a solid. The solid was reslurried in ethyl acetate, filtered, and the product dried to yield 2.15 g violet powder, mp350° C., λ(methanol)=808 nm ($\epsilon$=102,000).

DYE D-22

2-Hydroxyethoxyphenol(0.61 g,0.004 mol)in 10 ml dimethylformamide (DMF) was mixed with 0.16 g sodium hydroxide in 1 ml water. Then Compound I (2.11 g,0.002 mol) was added. After stirring 20 hrs at room temperature, the reaction mixture was warmed to ~40° C. for 2.5 hrs. The mixture was cooled, filtered to collect unreacted starting dye, and the filtrate then poured into 300 ml ethyl acetate. After stirring eight hours, the mixture was filtered, reslurried in ethyl acetate for two days, filtered, and the product dried to yield 1.95 g powder, mp dec.335° C., λ(methanol)=809 nm ($\epsilon$=182,000).

DYE D-23

4-Hydroxybenzoic acid, sodium salt (0.64 g,0.004 mol) in 10 ml dimethylformamide (DMF) was mixed with 0.16 g sodium hydroxide in 1 ml water. Then Compound I (1.88 g) was added. After stirring 22 hrs at room temperature, the reaction mixture was warmed to 60°–80° C. for 2.5 hrs. The mixture was cooled, allowed to stir overnight, and then filtered to collect product. The product was slurried in ethyl acetate, filtered, and dried to yield 1.23 g gold solid, mp350° C., λmax(methanol)=804 nm ($\epsilon$=83,000). Additional product was recovered by precipitation of reaction filtrate with ethyl acetate.

DYE D-24

2-(Hydroxyethoxy)phenol (0.17 g,0.001 mol)in 20 ml dimethylformamide (DMF) was mixed with 0.73 g of 1.5M aqueous sodium hydroxide solution. Then Compound D (1.67 g,0.001 mol) was added. After stirring 1.5 hrs. at room temperature, the reaction mixture was heated to 43°–66° C. for 7 hrs. total. After cooling overnight, the reaction mixture was filtered and then poured into 200 ml ethyl acetate. After stirring overnight, the mixture was filtered, reslurried in ethyl acetate, and the product dried to yield 1.09 g powder, mp350° C., λmax=807 nm ($\epsilon$=248,000).

DYE D-25

4-Hydroxyphenyl acetamide (0.23 g,0.0015 mol)in 10 ml dimethylformamide (DMF) was mixed with 1.00 g 1.5M aqueous sodium hydroxide solution. Then Compound I (1.58 g,0.0015 mol) was added. The mixture was stirred 1.5 hrs at room temperature and then warmed to ~40° C. for 5 hrs. The mixture was cooled, filtered, and the filtrate then poured into 200 ml ethyl acetate. After stirring overnight, the mixture was filtered, reslurried in ethyl acetate, filtered, and the product dried to yield 0. 16 g powder, mp>350° C., λ(methanol)=811 nm ($\epsilon$=225,000).

DYE D-26

4-Hydroxybenzenesulfonic acid, sodium salt dihydrate (0.49 g,0.0021 mol) in 10 ml dimethylformamide (DMF) was mixed with 1.4 ml of 1.5M aqueous sodium hydroxide solution. Then Compound I (2.11 g,0.002 mol) was added. The mixture was stirred 28 hrs at room temperature and then warmed first to ~60° C. for 1 hr., then to 90°–95° C. for 3 hrs. The mixture was cooled and filtered to collect product. The product was reslurried in ethyl acetate, filtered, and dried to yield 1.83 g black powder, mp dec.297° C., λmax(methanol)=811 nm ($\epsilon$=90,000). Precipitation of the reaction filtrate with 200 ml ethyl acetate, followed by filtering, rewashing in ethyl acetate, and drying yielded a small amount of very pure product, 0.26 g green solid, mp350° C., λmax(methanol)=811 nm ($\epsilon$ =258,000).

DYE D-27

3-Dimethylaminophenol (0.21 g,0.0015 mol)in 10 ml dimethylformamide (DMF) was mixed with 1.00 g 1.5M aqueous sodium hydroxide solution. Then Compound I( 1.58 g,0.0015 mol) was added. The mixture was stirred 24 hrs. at room temperature and then heated to 60° C. for ~13 hrs. The mixture was cooled, filtered, and the filtrate then poured into 200 ml ethyl acetate. After stirring overnight, the mixture was filtered, reslurried in ethyl acetate, filtered, and the product dried to yield 1.46 g powder, mp dec.290° C., λmax(methanol)=817 nm (ε=68,000),737 nm (ε=37,000).
DYE D-28

4-Hydroxypyridine (0.21 g,0.0022 mol) in 20 ml dimethylformamide (DMF) was mixed with 1.5 g of 1.5M aqueous sodium hydroxide solution. Then Compound J (1.51 g,0.002 mol) was added. The mixture was stirred at room temperature for 22 hrs., then heated at 52° C. for 6 hours. The reaction mixture was cooled, filtered, and then poured into 200 ml 5% aqueous potassium carbonate solution. After stirring one hour, the mixture was filtered, washed with water, and the product dried to yield 1.09 g powder, mp dec.176° C., λmax=821 nm (ε =120,000).
Dye D-30

4-Hydroxypyridine (0.40 g,0.0042 mol) in 20 ml dimethylformamide (DMF) was mixed with 2.8 g 1.5M aqueous sodium hydroxide. Then Compound A (2.48 g,0.004 mol) was added. After stirring 23.5 hours, the reaction mixture was filtered, then poured into 200 ml 5 % aqueous sodium carbonate solution. After stirring two hours, the mixture was filtered, washed with water, and the product dried to yield 2.40 g powder, mp161°–168° C., λmax=807 nm (ε=195,000).
Dye D-31

3-Hydroxypyridine (0.40 g,0.0042 mol) in 20 ml dimethylformamide (DMF) was mixed with 2.8 g 1.5M aqueous sodium hydroxide. Then Compound A (2.48 g,0.004 mol) was added. After stirring 3.5 hours, the reaction mixture was filtered, then poured into 200 ml 5% aqueous potassium carbonate solution. After stirring two hours, the mixture was filtered, washed with water, and the product dried to yield 2.29 g powder, mp130°–138° C., λmax=783 nm (ε=179,000).

EXAMPLE 1

Preparation of antihalation backing solution

A 7% gelatin solution is made by cold soaking and then dissolving dry gelatin in water. This solution contains the ingredients as tabulated below:

| Ingredient | Amount |
|---|---|
| deionized water | 1900 g |
| dry gelatin | 200 g |
| 5% polymethacrylate beads in a 4% aqueous gelatin solution | 50 g |
| 3 N sulfuric acid | 10 g |
| 16.5% aqueous Triton ⌀X-200 (28%) (trademark of Union Carbide Corp.) | 100 g |
| Lensodel ⌀HB7 (trademark of Shell Corp.) | 2 g |
| 10.2% aqueous Fluorad ⌀FC-129 (trademark of 3M Corp.) | 8 g |
| 10% aqueous Oxonol Red 536 Pina ⌀ (trademark of Riedel de Haën A.G.) | 25 g |
| 3.7% Aqueous formaldehyde | 50 g |
| Aqueous or alcoholic dye solution | up to 250 g |

The above-prepared coating solution containing 7% gelatin in water in then applied to a 0.007 inch polyethylene terephthalate substrate suitably subbed as described in Alles U.S. Pat. No. 2,779,684. Formaldehyde hardener is added into the gelatin solution. The coated layer is passed through a film dryer where cold air first sets the gelatin and then warm dry air removes the moisture and alcohol. The resulting antihalation layer contains 4.0 g gelatin/sq. meter. In the tables the symbols A, D, I, J, and K refer to the compounds in the section STARTING MATERIAL.

Optical densities for these dyes in an antihalation layer are shown in Table 6. The data of Table 6 clearly shows the dyes of this invention have superior and more efficient light-absorbing properties than comparative dye C-1. All dyes of this invention provide higher optical density at dye levels significantly lower than comparative dye C-1. This provides economic benefit since desired antihalation optical densities can be obtained at much lower dye levels relative to comparative dye C-1. The dyes of this invention provide absorption which is more suitable and optimally balanced for use with lasers emitting at 820 and 830 nm.

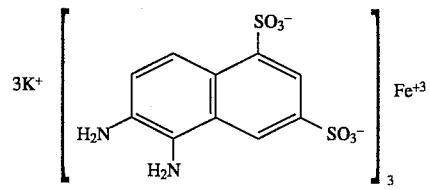

Comparative Compound C-1

EXAMPLE 2.

The antihalation layer was prepared as in Example 1. The films were tested for post-processing stain by processing the film at 90 sec. at 34° C. in DuPont MD developer and MF fixer. Residual dye stain is reported as per cent of fresh optical density. Fading of the films are reported as per cent of optical density after 3 days accelerated aging at 50° C and 60% relative humidity. The results obtained are presented in Table 7. The example clearly shows that the dyes of this invention provide improvement in fading characteristics compared to comparative dye A. Improvement in dye stain can also be obtained.

TABLE 1

EXEMPLARY DYES

| DYE | $R^1$ | $R^2$ | $R^3$ | $R^4$ | $R^5$ | $R^6$ | Q |
|---|---|---|---|---|---|---|---|
| D-1 | $CH_3$ | H | H | $CH_2CO_2^-$ | H | H | $CF_3SO_3^-$ |
| D-2 | $CH_3$ | H | H | $OCH_3$ | H | H | $CF_3SO_3^-$ |
| D-3 | $CH_3$ | H | $CO_2Na$ | H | $CO_2Na$ | H | $CF_3SO_3^-$ |
| D-4 | $CH_3$ | H | $NMe_2$ | H | H | H | $Cl^-$ |
| D-5 | $CH_3$ | H | H | $CH_2CONH_2$ | H | H | $Cl^-$ |
| D-6 | $CH_3$ | H | H | $CO_2Et$ | H | H | $CF_3SO_3^-$ |
| D-7 | $CH_3$ | H | H | CHO | H | H | $CF_3SO_3^-$ |
| D-8 | $CH_3$ | H | H | $SO_3^-$ | H | H | $CF_3SO_3^-$ |
| D-9 | $(CH_2)_4SO_3^-$ | H | H | $CO_2^-$ | H | $SO_3^-$ | 4Na+ |
| D-10 | $(CH_2)_4SO_3^-$ | OH | $SO_3^-$ | H | $SO_3^-$ | $SO_3^-$ | 5Na+ |

TABLE 2

EXEMPLARY DYES

| DYE | $R^1$ | $R^2$ | $R^3$ | $R^4$ | Q |
|---|---|---|---|---|---|
| D-11 | $CH_3$ | $OCH_3$ | H | H | $Cl^-$ |
| D-12 | $(CH_2)_4SO_3^-$ | $OCH_3$ | H | $SO_3^-$ | $Na^+/TEAH^+$ |
| D-13 | $(CH_2)_4SO_3^-$ | $OCH_3$ | H | H | $Na^+$ |
| D-14 | $CH_3$ | $CO_2Et$ | H | H | $^-OTs$ |

TABLE 3
EXEMPLARY DYES

[Structure diagram with substituents $R^1$, $R^2$, $R^3$, $R^4$, $R^5$, $R^6$ and counterion $Q^-$]

| DYE | $R^1$ | $R^2$ | $R^3$ | $R^4$ | $R^5$ | $R^6$ | Q |
|---|---|---|---|---|---|---|---|
| D-15 | $CH_3$ | $O(CH_2)_2OH$ | H | H | H | H | $^-OTs/Cl^-$ |
| D-16 | $CH_3$ | H | H | $CO_2Et$ | H | H | $^-OTs/Cl^-$ |
| D-17 | $CH_3$ | H | H | $CO_2Et$ | H | H | $Cl^-$ |
| D-18 | $CH_3$ | H | H | CHO | H | H | $Cl^-$ |
| D-19 | $(CH_2)_4SO_3^-$ | H | H | H | H | $SO_3^-$ | $3Na^+$ |
| D-20 | $(CH_2)_4SO_3^-$ | H | H | $SO_3^-$ | $SO_3^-$ | $SO_3^-$ | $6Na^+$ |
| D-21 | $(CH_2)_4SO_3^-$ | H | H | $CH_2CO_2^-$ | H | $SO_3^-$ | $4Na^+$ |
| D-22 | $(CH_2)_4SO_3^-$ | $O(CH_2)_2OH$ | H | H | H | $SO_3^-$ | $3Na^+$ |
| D-23 | $(CH_2)_4SO_3^-$ | H | H | $CO_2^-$ | H | $SO_3^-$ | $4Na^+$ |
| D-24 | $(CH_2)_4SO_3^-$ | $O(CH_2)_2OH$ | H | H | $SO_3^-$ | $SO_3^-$ | $Na^+/TEAH^+$ |
| D-25 | $(CH_2)_4SO_3^-$ | H | H | $CH_2CO_2NH_2$ | H | $SO_3^-$ | $3Na^+$ |
| D-26 | $(CH_2)_4SO_3^-$ | H | H | $SO_3^-$ | H | $SO_3^-$ | $4Na^+$ |
| D-27 | $(CH_2)_4SO_3^-$ | H | $NMe_2$ | H | H | $SO_3^-$ | $3Na^+$ |

TABLE 4
EXEMPLARY DYES

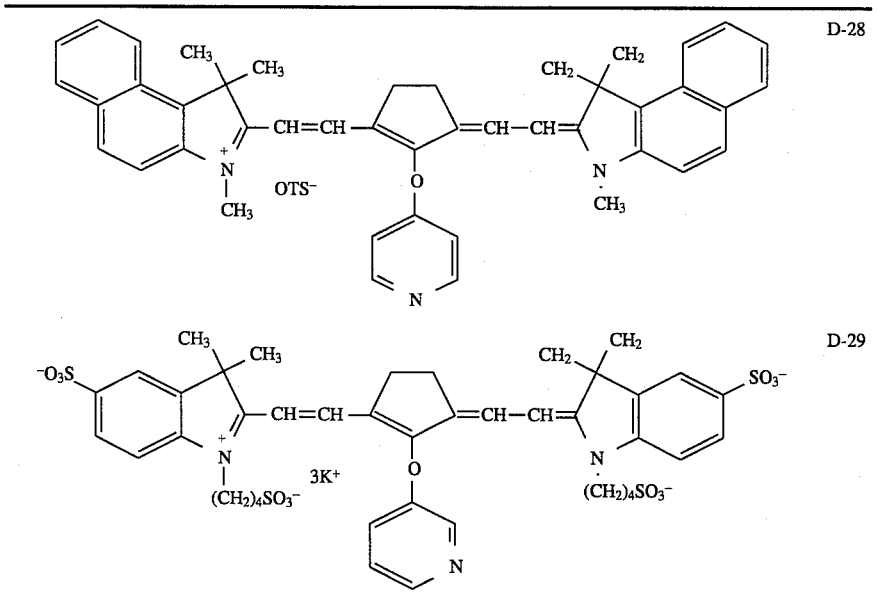

D-28

D-29

TABLE 4-continued
EXEMPLARY DYES

D-30: [structure: bis-indolium cyanine dye with cyclopentene bridge bearing 4-pyridyloxy substituent, CF₃SO₃⁻ counterion]

D-31: [structure: bis-indolium cyanine dye with cyclopentene bridge bearing 3-pyridyloxy substituent, CF₃SO₃⁻ counterion]

TABLE 5
PHYSICAL PROPERTIES FOR EXEMPLARY DYES

| DYE | $\lambda_{max}$(nm) | $\epsilon \times 10^{-5}$ | mp(°C.) |
|---|---|---|---|
| D-1 | 756/665 | 0.86/0.90 | 131–150 |
| D-2 | 763 | 1.9 | 95–115 |
| D-3 | 770/655 | 0.65/0.44 | 146–156 |
| D-4 | 771 | 1.51 | 148 |
| D-5 | 771 | 1.25 | 140–161 |
| D-6 | 780 | 1.82 | 119–130 |
| D-7 | 780 | 2.07 | 135–140 |
| D-8 | 781 | 1.38 | 184–205 |
| D-9 | 795 | 1.91 | 240–257 |
| D-10 | 802 | 1.14 | d. 290 |
| D-11 | 800 | 0.79 | 172 |
| D-12 | 811 | 2.26 | >350 |
| D-13 | 815 | 1.9 | d. 151 |
| D-14 | 822 | 1.15 | 150–172 |
| D-15 | 802 | 1.92 | 177–186 |
| D-16 | 802 | 1.57 | 148–162 |
| D-17 | 803 | 1.66 | 156–165 |
| D-18 | 804 | 1.87 | 160–171 |
| D-19 | 806 | 0.85 | >350 |
| D-20 | 810 | 2.21 | >350 |
| D-21 | 808 | 1.02 | >350 |
| D-22 | 809 | 1.82 | d. 335 |
| D-23 | 804 | 0.83 | >350 |
| D-24 | 807 | 2.48 | >350 |
| D-25 | 811 | 2.25 | >350 |
| D-26 | 811 | 0.90 | d. 297 |
| D-27 | 817 | 0.7 | d. 290 |
| D-28 | 822 | 1.2 | d. 176 |
| D-29 | 768 | 0.29 | d. 300 |
| D-30 | 807 | 1.95 | 161–168 |
| D-31 | 783/650 | 1.79/sh | 130–138 |

TABLE 6
Optical densities of antihalation layer at NEAR-IR laser wavelengths.

| Dye | $\lambda_{max}$ film (nm) | amt (mg/m²) | @$\lambda_{max}$ | 780 nm | 820 nm | 830 nm |
|---|---|---|---|---|---|---|
| J | 838 | 34.0 | 0.515 | 0.255 | 0.420 | 0.490 |
| D-22 | 825 | 32.0 | 0.396 | 0.169 | 0.385 | 0.387 |
| D-23 | 826 | 49.0 | 0.376 | 0.158 | 0.363 | 0.370 |
| D-26 | 827 | 48.0 | 0.344 | 0.129 | 0.327 | 0.340 |
| D-21 | 824 | 50.1 | 0.364 | 0.160 | 0.360 | 0.350 |
| D-19 | 823 | 49.2 | 0.330 | 0.154 | 0.326 | 0.316 |
| D | 827 | 27.2 | 0.365 | 0.132 | 0.347 | 0.363 |
| D-20 | 823 | 32.0 | 0.409 | 0.177 | 0.406 | 0.384 |
| D-24 | 823 | 32.0 | 0.403 | 0.164 | 0.398 | 0.383 |
| K | 827 | 34.0 | 0.510 | 0.233 | 0.495 | 0.505 |
| D-9 | 808 | 31.5 | 0.380 | 0.274 | 0.355 | 0.293 |
| D-10 | 818 | 50.1 | 0.352 | 0.255 | 0.350 | 0.327 |
| C-1 | 705 | 93.8 | 0.198 | 0.140 | 0.073 | 0.054 |

TABLE 7
Aging results of Antihalation Layer

| Dye | $\lambda_{max}$ (film) nm | % Stain | % Fading |
|---|---|---|---|
| I | 838 | 50 | 100 |
| D-22 | 825 | 45 | 99 |
| D-23 | 826 | 49 | 101 |
| D-26 | 827 | 45 | 95 |
| D-21 | 824 | 55 | 103 |
| D-19 | 823 | 73 | 107 |
| D | 827 | 26 | 95 |
| D-20 | 823 | 28 | 99 |
| D-24 | 823 | 25 | 99 |
| K | 827 | 15 | 81 |
| D-9 | 808 | 14 | 67 |
| D-10 | 818 | 20 | 57 |
| A | 822 | 44 | 49 |

What is claimed is:
1. A dye suitable for use in a photographic element chosen from the group consisting of:

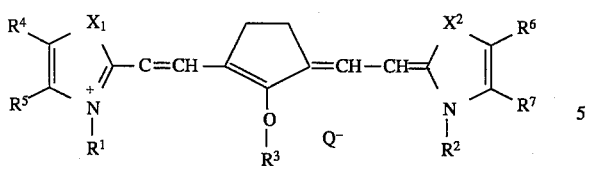

wherein

X$^1$, X$^2$ independently represent —Se—, —NR$^{10}$, —CH=CH— or —O—;

R$^1$ and R$^2$ independently represent alkyl of 1 to 10 carbons;

R$^3$ represents a ring chosen from the group consisting of aromatic ring of 6 or 10 carbons and a heterocyclic ring;

R$^4$, R$^5$, R$^6$ and R$^7$ independently represent hydrogen, or alkyl of 1–10 carbons, or R$^4$ and R$^5$ taken together or R$^6$ and R$^7$ taken together represent the atoms necessary to form a 5 or 6-membered aliphatic ring, an aromatic six-membered ring, or an aromatic 10-membered ring;

R$^{10}$ represents an alkyl of 1–10 carbons or aromatic ring of 6 or 10 carbons;

Q represents a counterion; and

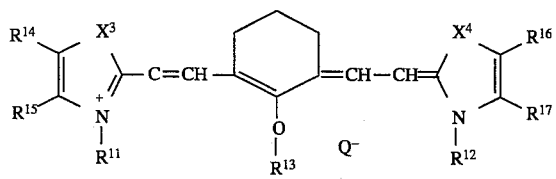

wherein:

X$^3$, X$^4$ independently represent —Se—, —NR$^{18}$—, —CH=CH— or —O—;

R$^{11}$ and R$^{12}$ independently represent alkyl of 1 to 10 carbons;

R$^{13}$ represents a ring chosen from the group consisting of aromatic ring of 6 or 10 carbons and heterocyclic ring;

R$^{14}$, R$^{15}$, R$^{16}$ and R$^{17}$ independently represent hydrogen, or alkyl of 1–10 carbons, or R$^{14}$ and R$^{15}$ taken together or R$^{16}$ and R$^{17}$ taken together represent the atoms necessary to form a 5 or 6-membered aliphatic ring, an aromatic six-membered ring, or an aromatic 10-membered ring;

R$^{18}$ represents an alkyl of 1–10 carbons or aromatic ring of 6 or 10 carbons; and Q is defined above.

2. A dye as recited in claim 1 wherein said dye is:

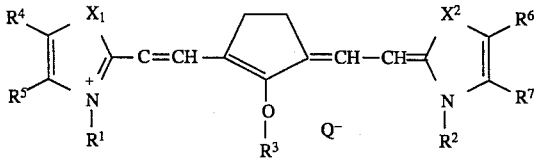

wherein

X$^1$, X$^2$ represent —O—;

R$^1$ and R$^2$ independently represent alkyl of 1 to 10 carbons;

R$^3$ represents a ring chosen from the group consisting of aromatic ring of 6 or 10 carbons and a heterocyclic ring;

R$^4$ and R$^5$ taken together or R$^6$ and R$^7$ taken together represent an aromatic 6 or 10 membered aromatic ring; and Q represents a counterion.

3. A dye as recited in claim 2 wherein:

R$^1$ and R$^2$ independently represent alkyl of 1–5 carbons;

R$^3$ represents an aromatic ring of 6 or 10 carbons; and

R$^4$ and R$^5$ or R$^6$ and R$^7$ are taken together to represent an aromatic ring of 6 or 10 carbons.

4. A dye recited in claim 1 wherein at least one of R$^1$–R$^7$ and R$^{10}$–R$^{18}$ is substituted by at least one group chosen from the group consisting of —SO$_3^-$ and —CO$_2^-$.

5. A dye recited in claim 4 wherein at least two of R$^1$–R$^7$ and R$^{10}$–R$^{18}$ are substituted by at least one group chosen from the group consisting of —SO$_3^-$ and —C$_2^-$.

6. A dye as recited in claim 1 wherein: at least one of the group consisting of R$^1$, R$^2$, R$^4$, R$^5$, R$^6$, R$^7$, R$^{10}$, R$^{11}$, R$^{12}$, R$^{14}$, R$^{15}$, R$^{16}$, R$^{17}$, and R$^{18}$ represents a straight or branched alkyl of 1–10 carbons substituted with at least one group from the group consisting of sulfonate, carboxyl, hydroxy, halogen, carbonylalkyl, amine, aryl and —OL where L is an alkyl of 1–10 carbons.

* * * * *